United States Patent
Yan et al.

(10) Patent No.: US 10,755,238 B2
(45) Date of Patent: Aug. 25, 2020

(54) TRANSMISSION METHOD, APPARATUS AND SYSTEM

(71) Applicant: Siemens Aktiengesellschaft, Munich (DE)

(72) Inventors: Tao Yan, Beijing (CN); Jing Jing Fang, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 222 days.

(21) Appl. No.: 15/867,889

(22) Filed: Jan. 11, 2018

(65) Prior Publication Data

US 2018/0211063 A1 Jul. 26, 2018

(30) Foreign Application Priority Data

Jan. 24, 2017 (CN) .......................... 2017 1 0062986

(51) Int. Cl.
*G06F 21/62* (2013.01)
*G06Q 20/02* (2012.01)
(Continued)

(52) U.S. Cl.
CPC ......... *G06Q 20/02* (2013.01); *G06F 21/6245* (2013.01); *G06F 21/6263* (2013.01);
(Continued)

(58) Field of Classification Search
CPC ............ G06F 21/6263; G06F 21/6245; H04L 63/0414; H04L 63/04; H04L 67/12;
(Continued)

(56) References Cited

U.S. PATENT DOCUMENTS 8,533,055 B1 * 9/2013 Brazil ................... G06Q 30/00
705/26.1
2011/0258443 A1 10/2011 Barry
(Continued)

FOREIGN PATENT DOCUMENTS

| CN | 102752444 A | 10/2012 |
| CN | 102930451 A | 2/2013 |

(Continued)

OTHER PUBLICATIONS

Extended European Search Report dated May 4, 2018.
Chinese Office Action dated May 25, 2020.

*Primary Examiner* — Michael R Vaughan
(74) *Attorney, Agent, or Firm* — Harness, Dickey & Pierce, P.L.C.

(57) ABSTRACT

A thing information transmission method, apparatus and system in the Internet of Things are for reducing risk of sensitive information leakage when thing information is acquired in the current Internet of Things. In a thing information transmission method of an embodiment, a second device sends thing identification information to a first device, and the first device sends a thing information request message to a third device, the thing information request message including verification information and the thing identification information, the verification information not including device identification information about the second device and also not including identity identification information about a user. The third device sends thing information to the first device when determining that the thing information request message has a permission of the acquired thing information according to the verification information. The leakage of the device identification and user identity can be effectively avoided.

12 Claims, 5 Drawing Sheets

(51) Int. Cl.
*G06Q 20/32* (2012.01)
*H04W 12/02* (2009.01)
*H04W 4/70* (2018.01)
*G06Q 20/40* (2012.01)
*H04L 29/06* (2006.01)
*H04W 12/00* (2009.01)
*H04L 29/08* (2006.01)

(52) U.S. Cl.
CPC ..... *G06Q 20/3229* (2013.01); *G06Q 20/4014* (2013.01); *H04L 63/04* (2013.01); *H04L 63/0414* (2013.01); *H04W 4/70* (2018.02); *H04W 12/0013* (2019.01); *H04W 12/02* (2013.01); *H04L 67/12* (2013.01)

(58) Field of Classification Search
CPC ............... H04L 63/0876; G06Q 20/02; G06Q 20/4014; G06Q 20/3229; H04W 4/70; H04W 12/02
See application file for complete search history.

(56) References Cited

U.S. PATENT DOCUMENTS

| | | | |
|---|---|---|---|
| 2015/0206124 A1* | 7/2015 | Aubin | G06Q 20/32 705/71 |
| 2015/0302215 A1 | 10/2015 | Hu | |
| 2015/0332226 A1 | 11/2015 | Wu et al. | |
| 2019/0287141 A1* | 9/2019 | Bordeleau | G06Q 30/0278 |

FOREIGN PATENT DOCUMENTS

| | | |
|---|---|---|
| CN | 103258182 A | 8/2013 |
| CN | 103532971 A | 1/2014 |
| CN | 103593750 A | 2/2014 |
| CN | 104463593 A | 3/2015 |
| CN | 105095978 A | 11/2015 |
| CN | 105187357 A | 12/2015 |
| CN | 105448006 A | 3/2016 |
| CN | 105912968 A | 8/2016 |
| EP | 2378451 A1 | 10/2011 |

* cited by examiner

TRANSMISSION METHOD, APPARATUS AND SYSTEM

PRIORITY STATEMENT

The present application hereby claims priority under 35 U.S.C. § 119 to Chinese patent application number CN 201710062986.9 filed Jan. 24, 2017, the entire contents of which are hereby incorporated herein by reference.

Field

At least one embodiment of the present invention generally relates to the technical field of information processing of the Internet of Things and in particular to a thing information transmission method, apparatus and/or system in the Internet of Things.

Background Art

The Internet of Things (IoT) is a network where things are connected. In the Internet of Things, things can be in communication with each other and transmit information.

Generally, things in the Internet of Things are labelled with tags, one tag for uniquely identifying one thing, or one tag for uniquely identifying a category of things (e.g., spring water of the same brand and the same class in a supermarket has the same tag, and the price thereof is the same). Common tag categories include, but are not limited to: a one-dimensional bar code, a two-dimensional bar code, a magnetic card, an IC card, a radio frequency identification (RFID) tag, etc. Thing information about a thing labelled by a tag can be acquired by scanning the tag.

FIG. 1 shows an example of acquiring thing information. When a consumer checks out at a counter of a supermarket, a tag 102 (such as: a one-dimensional bar code) on a thing 101 purchased by the consumer is scanned by a scanning device 103 (such as: a bar code scanner), and the scanning device 103 obtains thing identification information 106 about the thing 101 recorded in the tag 102 by means of scanning. The scanning device 103 sends, via a computer 104 connected therewith, the scanned thing identification information 106 to an object information server (OIS) 105, and sends device identification of the computer 104 or a user's account name to the OIS 105. The OIS 105 verifies the device identification of the computer 104 or the user's account name of the computer 104, and if the verification is passed, thing information 107 about the thing 101 is returned to the computer 104.

In the example shown in FIG. 1, the computer 104 sends the device identification thereof or the user's account name to the OIS 105, and when the communication between the computer 104 and the OIS 105 is insecure, e.g., an interceptor exists, the device identification of the computer 104 or the user's account name may be intercepted, and when the sensitive information is leaked, a risk that the computer or account is tracked exists.

SUMMARY

Embodiments of the present invention provide a transmission method, apparatus and system in the Internet of Things. At least one embodiment is for reducing the risks of leakage of sensitive information, such as device identification or account, and a computer of account being tracked when thing information is acquired in the current Internet of Things.

In a first embodiment, a thing information transmission method in the Internet of Things is provided. In the method, one thing in the Internet of Things is identified by one tag, the tag recording thing identification information about the thing. A second device acquires the thing identification information from the tag and sends same to a first device. The first device determines verification information, wherein the verification information describes a device attribute of the second device, and does not comprise device identification information about the second device, and/or the verification information describes an attribute of a user of the second device, and does not comprise identity identification information about the user. The first device sends a thing information request message to a third device, wherein the thing information request message comprises the verification information and the thing identification information. The third device sends thing information to the first device when it is determined that the thing information request message has a permission of the acquired thing information according to the verification information. The first device sends the received thing information to the second device.

In another embodiment, a first device is provided for implementing the functions of the first device in the first embodiment, comprising:

a first transceiving module, for receiving thing identification information about a thing in the Internet of Things from a second device, wherein the thing identification information is recorded in one tag for identifying the thing, and the second device is used for acquiring the thing identification information from the tag;

a processing module, for determining verification information, wherein the verification information describes a device attribute of the second device, and does not comprise device identification information about the second device, and/or the verification information describes an attribute of a user of the second device, and does not comprise identity identification information about the user;

a second transceiving module, for sending a thing information request message to a third device, wherein the thing information request message comprises the verification information and the thing identification information, and the third device is used for, when it is determined that the thing information request message has a permission of the acquired thing information according to the verification information, providing the thing information;

the second transceiving module, further for receiving the thing information from the third device; and the first transceiving module, further for sending the thing information received by the second transceiving module to the second device.

In another embodiment, a non-transitory machine readable medium is provided. The machine readable medium stores thereon machine instructions that, when being executed by a processor, cause the processor to execute the following steps:

receiving thing identification information about a thing in the Internet of Things from a second device, wherein the thing identification information is recorded in one tag for identifying the thing, and the second device is used for acquiring the thing identification information from the tag;

determining verification information, wherein the verification information describes a device attribute of the second device, and does not comprise device identification information about the second device, and/or the verification information describes an attribute of a user of the second device, and does not comprise identity identification information about the user;

sending a thing information request message to a third device, wherein the thing information request message comprises the verification information and the thing identification information, and the third device is used for, when determining that the thing information request message has a permission of the acquired thing information according to the verification information, providing the thing information;

receiving the thing information from the third device; and sending the received thing information to the second device.

Figure 1:
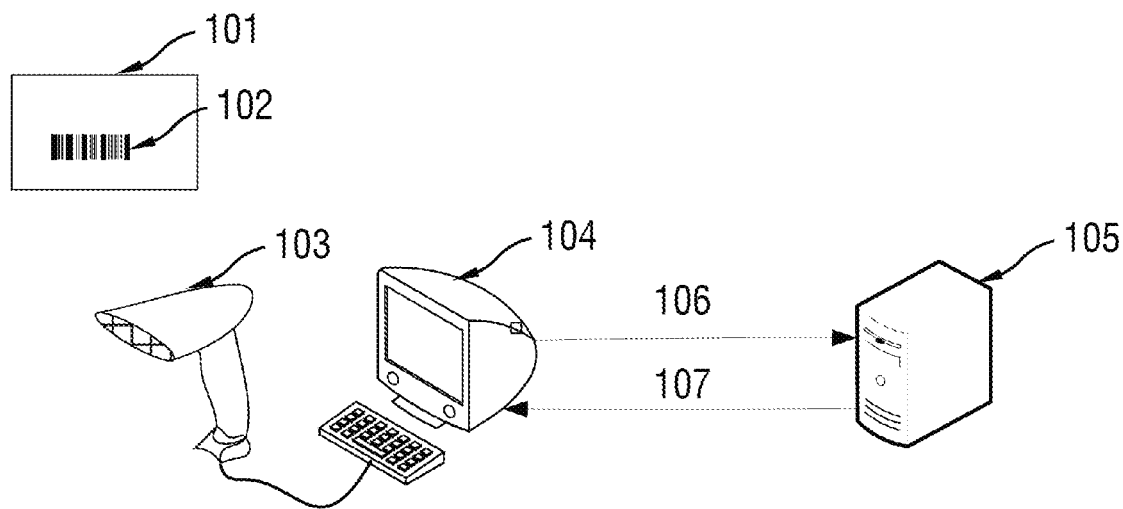
FIG. 1 shows an example of acquiring thing information.

LIST OF REFERENCE NUMERALS:

101: Thing
102: Tag
103: Scanning device
104: Computer
105: OIS
106: Thing identification information
107: Thing information
201: First device
202: Second device
203: Third device
204: Fourth device
210: Thing
220: Tag
230: Thing identification information
240: Verification information
250: Thing information
260: Position information about a position where the thing information 250 is located
20: System S301: Acquiring thing identification information 230 about a thing 210 from a tag 220

S302: A second device 202 sending the thing identification information 230 to a first device 201

S303: The first device 201 requesting from a fourth device 204 position information 260 about a position where the thing identification information 230 is located S304: The fourth device 204 returning the position information 260 to the first device 201

S305: The first device 201 determining verification information 240

S306: The first device 201 sending a thing information request message to a third device 203 indicated by the position information 260, the message including the verification information 240 and the thing identification information 230

S307: The third device 203 determining, according to the verification information 240, whether the thing information request message has a permission of acquired thing information 250

S308: If the thing information request message has the permission of the acquired thing information 250, returning the thing information 250 to the first device 201

S309: The first device 201 returning the thing information 250 to the third device 203

S310: The second device 202 sending a thing purchasing request message for purchasing the thing 210 to the first device 201

S311: The first device 201 paying the fee for purchasing the thing 210

S312: The first device 201 recording trade information about the thing 210

S313: The first device 201 notifying the third device 203 to delete the thing information 250

S314: The third device 203 deleting the thing information 250

S315: The second device 202 requesting from the first device 201 trade information about the thing 210

S316: The first device 201 returning the trade information about the thing 210 to the second device 202

S401: Receiving thing identification information 230

S402: Requesting from a fourth device 204 position information 260 about a position where the thing identification information 230 is located S403: Receiving the position information 260 returned by the fourth device 204

S404: Determining verification information 240

S405: Sending a thing information request message to a third device 203, the message including the verification information 240 and the thing identification information 230

S406: Receiving the thing information 250 from the third device 203

S407: Returning the thing information 250 to the second device 202

S408: Receiving a thing purchasing request message for purchasing a thing 210 from the second device 202

S409: Paying the fee for purchasing the thing 210

S410: Recording trade information about the thing 210

S411: Notifying the third device 203 to delete the thing information 250

S412: Receiving a request for trade information about the thing 210 from the second device 202

S413: Returning the trade information about the thing 210 to the second device 202

S501: Receiving a thing information request message from a first device 201

S502: Determining, according to verification information 240 in the thing information request message, whether the thing information request message has a permission of acquired thing information 250

S503: Sending the thing information 250 to the first device 201

S504: Receiving from the first device 201 a notification of deleting the thing information 250

S505: Deleting the thing information 250

601: Tag recorded with RFID

602: Mobile phone

603: Mobile operator device

604: Object naming service (ONS) server

605: OIS

S610: Requesting an electronic product code (EPC)

S620: Returning the EPC

S630: EPC

S640: Requesting a uniform resource locator (URL) of a position where thing information is located S650: Returning the URL S660: Requesting from the OIS 605 thing information according to the URL S670: The OIS 605 sending the thing information S680: Sending the thing information to the mobile phone 602

2011: First transceiving module

2012: Processing module

2013: Second transceiving module

2014: First transceiver

2015: Processor

2016: Second transceiver

2031: Transceiving module

2032: Processing module

2033: Transceiver

2034: Processor

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor) . Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flowcharts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices maybe described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors maybe configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In a first embodiment, a thing information transmission method in the Internet of Things is provided. In the method, one thing in the Internet of Things is identified by one tag, the tag recording thing identification information about the thing. A second device acquires the thing identification information from the tag and sends same to a first device. The first device determines verification information, wherein the verification information describes a device attribute of the second device, and does not comprise device identification information about the second device, and/or the verification information describes an attribute of a user of the second device, and does not comprise identity identification information about the user. The first device sends a thing information request message to a third device, wherein the thing information request message comprises the verification information and the thing identification information. The third device sends thing information to the first device when it is determined that the thing information request message has a permission of the acquired thing information according to the verification information. The first device sends the received thing information to the second device.

In thing information transmission, access permission of the second device or a user of the second device requesting the thing information is verified, so as to avoid the thing information being acquired by an accessor without the permission. However, in order to avoid the leakage of the device identification and user identity, when the thing information is acquired, verification information not including the device identification information about the second device is provided, or verification information not including the identity identification information about the user is provided, which can effectively avoid the leakage of the device identification and user identity.

In one possible implementation, after receiving the thing identification information and before determining the verification information, the first device determines whether the second device or a user of the second device is legal, and if so, determines the verification information.

For example: after receiving the thing identification information and before determining the verification information, the first device determines, according to the device identification information about the second device, whether the second device is legal, and if so, determines the verification information.

Or, for example: after receiving the thing identification information and before determining the verification information, the first device determines whether the user of the second device is legal according to identity identification information about the user of the second device, and if the user of the second device is legal, the first device determines the verification information.

Or for another example: after receiving the thing identification information and before determining the verification information, the first device determines, according to the device identification information about the second device, whether the second device is legal, and determines, according to the identity identification information about the user of the second device, whether the user of the second device is legal, and if the second device and the user of the second device are both legal, determines the verification information.

In one possible implementation, the second device determines whether the second device or the user of the second device is legal, and if so, determines the verification information, and thus acquires thing information. This can avoid the leakage of the device identification and the user identity, and is also able to prevent an illegal device or user from acquiring thing information.

In one possible implementation, the second device acquires the thing information to trade the thing, and the first device records, after sending the received thing information to the second device, trade information about the thing, and sends the trade information to the second device.

In one possible implementation, the second device can acquire the trade information about the thing via the first device.

Furthermore, optionally, the thing identification information is used for uniquely identifying the thing, and after determining that the thing is traded successfully, the first device notifies the third device to delete the thing information. After receiving from the first device a notification of deleting the thing information, the third device deletes the thing information, wherein after the thing is traded successfully, the thing information is deleted from a server for providing thing information, and in this way, after the trade is successful, an interceptor is unable to acquire thing information from the server, which further ensures that the thing information is not intercepted.

In a second embodiment, another thing information transmission method in the Internet of Things is provided, and the method can be executed by the first device involved in the first embodiment, the method comprising:

the first device receiving thing identification information about a thing in the Internet of Things from a second device, wherein the thing identification information is recorded in one tag for identifying the thing, and the second device is used for acquiring the thing identification information from the tag;

the first device determining verification information, wherein the verification information describes a device attribute of the second device, and does not comprise device identification information about the second device, and/or the verification information describes an attribute of a user of the second device, and does not comprise identity identification information about the user;

the first device sending a thing information request message to a third device, wherein the thing information request message comprises the verification information and the thing identification information, and the third device is used for, when it is determined that the thing information request message has a permission of the acquired thing information according to the verification information, providing the thing information;

the first device receiving the thing information from the third device; and the first device sending the received thing information to the second device.

In thing information transmission, access permission of the second device or a user of the second device requesting the thing information is verified, so as to avoid the thing information being acquired by an accessor without the permission. However, in order to avoid the leakage of the device identification and user identity, when the thing information is acquired, verification information not including the device identification information about the second device is provided, or verification information not including the identity identification information about the user is provided, which can effectively avoid the leakage of the device identification and user identity.

In one possible implementation, after the first device receives the thing identification information and before it determines the verification information, the method further comprises: the first device determining, according to the device identification information about the second device, whether the second device is legal, and the first device determining the verification information, comprising: if the first device determines that the second device is legal, determining the verification information; and/or after the first device receiving the thing identification information and before determining the verification information, the method further comprises: the first device determining, according to the device identification information about a user of the second device, whether the user of the second device is legal, and the first device determining the verification information, comprising: if the first device determines that the user of the second device is legal, determining the verification information.

In one possible implementation, the second device determines whether the second device or the user of the second device is legal, and if so, determines the verification information, and thus acquires thing information. This can avoid the leakage of the device identification and the user identity, and is also able to prevent an illegal device or user from acquiring thing information.

In one possible implementation, the second device acquires the thing information to trade the thing, and after the first device sends the received thing information to the second device, the method further comprises: the first device recording trade information about the thing; and the first device sending the trade information to the second device.

In one possible implementation, the second device can acquire the trade information about the thing via the first device.

Furthermore, optionally, the thing identification information is used for uniquely identifying the thing, and the method further comprises: after the first device determines that the thing is traded successfully, notifying the third device to delete the thing information, wherein after the thing is traded successfully, the thing information is deleted from a server for providing thing information, and in this way, after the trade is successful, an interceptor is unable to acquire thing information from the server, which further ensures that the thing information is not intercepted.

In a third embodiment, yet another thing information transmission method in the Internet of Things is provided, and the method can be executed by the third device involved in the first embodiment, the method comprising:

a third device receiving a thing information request message from a first device, the thing information request message comprising the verification information and the thing identification information, wherein the thing identification information is recorded in a tag for identifying a thing in the Internet of Things; the verification information describes a device attribute of the second device, and does not comprise device identification information about the second device, and/or the verification information describes an attribute of a user of the second device, and does not comprise identity identification information about the user;

the third device determining, according to the verification information, whether the thing information request message has a permission of the acquired thing information; and if the thing information request message has the permission of the acquired thing information, sending the thing information to the first device.

In thing information transmission, access permission of the second device or a user of the second device requesting the thing information is verified, so as to avoid the thing information being acquired by an accessor without the permission. However, in order to avoid the leakage of the device identification and user identity, when the thing information is acquired, verification information not including the device identification information about the second device is provided, or verification information not including the identity identification information about the user is provided, which can effectively avoid the leakage of the device identification and user identity.

In one possible implementation, the thing identification information is used for uniquely identifying the thing, and the thing information is acquired to trade the thing, the method further comprising: after receiving from the first device a notification of deleting the thing information, the third device deletes the thing information, wherein after the thing is traded successfully, the thing information is deleted from a server for providing thing information, and in this way, after the trade is successful, an interceptor is unable to acquire thing information from the server, which further ensures that the thing information is not intercepted.

In a fourth embodiment, a thing information transmission system in the Internet of Things is provided, the system comprising the first device, second device and third device involved in the first embodiment.

In a fifth embodiment, a first device is provided for implementing the functions of the first device in the first embodiment, comprising:

a first transceiving module, for receiving thing identification information about a thing in the Internet of Things from a second device, wherein the thing identification information is recorded in one tag for identifying the thing, and the second device is used for acquiring the thing identification information from the tag;

a processing module, for determining verification information, wherein the verification information describes a device attribute of the second device, and does not comprise device identification information about the second device, and/or the verification information describes an attribute of a user of the second device, and does not comprise identity identification information about the user;

a second transceiving module, for sending a thing information request message to a third device, wherein the thing information request message comprises the verification information and the thing identification information, and the third device is used for, when it is determined that the thing information request message has a permission of the acquired thing information according to the verification information, providing the thing information;

the second transceiving module, further for receiving the thing information from the third device; and the first transceiving module, further for sending the thing information received by the second transceiving module to the second device.

In thing information transmission, access permission of the second device or a user of the second device requesting the thing information is verified, so as to avoid the thing information being acquired by an accessor without the permission. However, in order to avoid the leakage of the device identification and user identity, when the thing information is acquired, verification information not including the device identification information about the second device is provided, or verification information not including the identity identification information about the user is provided, which can effectively avoid the leakage of the device identification and user identity.

In one possible implementation, the processing module is further used for: after the first transceiving module receives the thing identification information and before the processing module determines the verification information, determining, according to the device identification information about the second device, whether the second device is legal; when determining the verification information, the processing module is specifically used for: if the second device is legal, determining the verification information; and/or the processing module is further used for: after the first transceiving module receives the thing identification information and before the processing module determines the verification information, determining, according to identity identification information about a user of the second device, whether the user of the second device is legal, and when determining the verification information, the processing module is specifically used for: if the user of the second device is legal, determining the verification information.

In one possible implementation, the second device determines whether the second device or the user of the second device is legal, and if so, determines the verification information, and thus acquires thing information. This can avoid the leakage of the device identification and the user identity, and is also able to prevent an illegal device or user from acquiring thing information.

In one possible implementation, the second device acquires the thing information to trade the thing, and the processing module is further used for: after the first transceiving module sends the thing information received by the second transceiving module to the second device, recording trade information about the thing; and the first transceiving module is further used for: sending the trade information to the second device.

In one possible implementation, the second device can acquire the trade information about the thing via the first device.

Furthermore, optionally, the thing identification information is used for uniquely identifying the thing, and the processing module is further used for: after determining that the thing is traded successfully, notifying via the second transceiving module the third device to delete the thing information, wherein after the thing is traded successfully, the thing information is deleted from a server for providing thing information, and in this way, after the trade is successful, an interceptor is unable to acquire thing information from the server, which further ensures that the thing information is not intercepted.

In a sixth embodiment, a third device is provided for implementing thing information transmission in the Internet of Things, comprising:

a transceiving module, for receiving a thing information request message from a first device, the thing information request message comprising the verification information and the thing identification information, wherein the thing identification information is recorded in a tag for identifying a thing in the Internet of Things; the verification information describes a device attribute of the second device, and does not comprise device identification information about the second device, and/or the verification information describes an attribute of a user of the second device, and does not comprise identity identification information about the user;

a processing module, for determining, according to the verification information, whether the thing information request message has a permission of the acquired thing information; and the transceiving module, further for, if the thing information request message has the permission of the acquired thing information, sending the thing information to the first device.

In thing information transmission, access permission of the second device or a user of the second device requesting the thing information is verified, so as to avoid the thing information being acquired by an accessor without the permission. However, in order to avoid the leakage of the device identification and user identity, when the thing information is acquired, verification information not including the device identification information about the second device is provided, or verification information not including the identity identification information about the user is provided, which can effectively avoid the leakage of the device identification and user identity.

In one possible implementation, the thing identification information is used for uniquely identifying the thing, and the thing information is acquired to trade the thing, and the processing module is further used for: after receiving from the first device via the transceiving module a notification of deleting the thing information, deleting the thing information, wherein after the thing is traded successfully, the thing information is deleted from a server for providing thing information, and in this way, after the trade is successful, an interceptor is unable to acquire thing information from the server, which further ensures that the thing information is not intercepted.

In a seventh embodiment, a first device is provided, comprising:

a first transceiver, for receiving thing identification information about a thing in the Internet of Things from a second device, wherein the thing identification information is recorded in one tag for identifying the thing, and the second device is used for acquiring the thing identification information from the tag;

a processor, for determining verification information, wherein the verification information describes a device attribute of the second device, and does not comprise device identification information about the second device, and/or the verification information describes an attribute of a user of the second device, and does not comprise identity identification information about the user;

a second transceiver, for sending a thing information request message to a third device, wherein the thing information request message comprises the verification information and the thing identification information, and the third device is used for, when it is determined that the thing information request message has a permission of the acquired thing information according to the verification information, providing the thing information;

the second transceiver, further for receiving the thing information from the third device; and the first transceiver, further for sending the thing information received by the second transceiver to the second device.

In thing information transmission, access permission of the second device or a user of the second device requesting the thing information is verified, so as to avoid the thing information being acquired by an accessor without the permission. However, in order to avoid the leakage of the device identification and user identity, when the thing information is acquired, verification information not including the device identification information about the second device is provided, or verification information not including the identity identification information about the user is provided, which can effectively avoid the leakage of the device identification and user identity.

In an eighth embodiment, a third device is provided for implementing thing information transmission in the Internet of Things, comprising:

a transceiver, for receiving a thing information request message from a first device, the thing information request message comprising the verification information and the thing identification information, wherein the thing identification information is recorded in a tag for identifying a thing in the Internet of Things; the verification information describes a device attribute of the second device, and does not comprise device identification information about the second device, and/or the verification information describes an attribute of a user of the second device, and does not comprise identity identification information about the user;

a processor, for determining, according to the verification information, whether the thing information request message has a permission of the acquired thing information; and the transceiver, further for, if the thing information request message has a permission of the acquired thing information, sending the thing information to the first device.

In thing information transmission, access permission of the second device or a user of the second device requesting the thing information is verified, so as to avoid the thing information being acquired by an accessor without the permission. However, in order to avoid the leakage of the device identification and user identity, when the thing information is acquired, verification information not including the device identification information about the second device is provided, or verification information not including the identity identification information about the user is provided, which can effectively avoid the leakage of the device identification and user identity.

In a ninth embodiment, a machine readable medium is provided, wherein the machine readable medium stores thereon machine instructions that, when being executed by a processor, cause the processor to execute the method provided by the second embodiment or any possible implementation of the second embodiment, the third embodiment or any possible implementation of the third embodiment.

In combination with any of the above embodiments or any possible implementation of any of the above embodiments, in one possible implementation, the first device is trustworthy for the second device and the third device, wherein a device which is trustworthy for both the second device and the third device serves as an intermediate device, which receives thing identification information from the first device in one embodiment, and sends the aforementioned verification information to the third device to acquire thing information in another embodiment. This can ensure secure transmission of thing information, and is also able to avoid the leakage of device identification of the second device and an identity identification of a user of the second device.

Furthermore, optionally, the first device is a device provided by a mobile operator, and the second device is a mobile terminal where the mobile operator provides services, wherein the device provided by the mobile operator serves as a device, which is trustworthy for both the mobile terminal and a server which provides thing information, for transmitting the thing information mentioned above, and has the advantages of being convenient, fast and secure.

In the example shown in FIG. 1, when thing information is acquired, device identification or an account name needs to be sent to an OIS, and a risk that a computer or account is tracked exists due to a sensitive information protocol.

In the embodiments of the present invention, when thing information is acquired, device attribute information not including device identification or user attribute information not including a user identity identification is sent, which effectively avoids the leakage of the device identification and user identity.

Furthermore, a third party device provides verification information for permission verification. The third party device is trustworthy for a device which requests the thing information, and a server which provides the thing information, thereby further ensuring the security of information transmission.

Furthermore, if the thing information is acquired for thing trade, after the thing is traded successfully, the thing information is deleted from a server for providing thing information, and in this way, after the trade is successful, an interceptor is unable to acquire thing information from the server, which further ensures that the thing information is not intercepted.

The embodiments of the present invention will be described in detail below in conjunction with the accompanying drawings.

Figure 2:
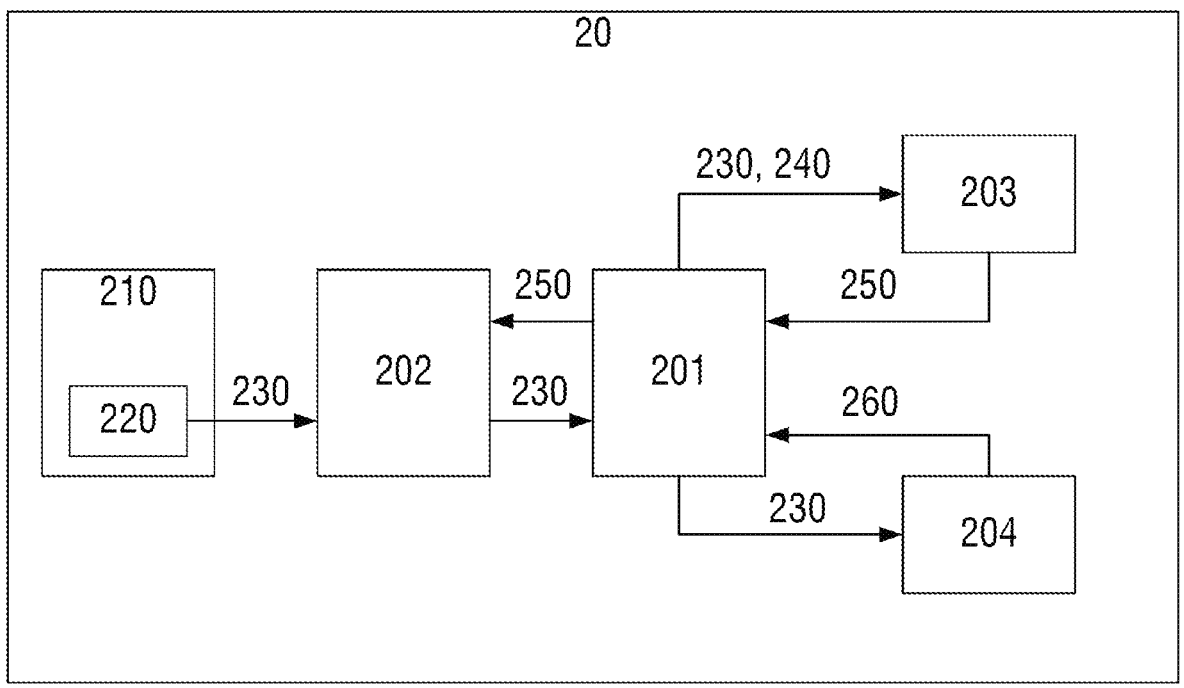
FIG. 2 is a schematic structural diagram of a thing information transmission system in the Internet of Things provided by the embodiments of the present invention.

FIG. 2 is a schematic structural diagram of a thing information transmission system 20 in the Internet of Things provided by the embodiments of the present invention. As shown in FIG. 2, the system 20 may comprise:

A thing 210, wherein the thing 210 may be a physical entity, and may also be a service. Certainly, the system 20 may comprise not only one thing 210.

A tag 220 for identifying the thing 210, wherein the tag 220 may be adhered to the thing 210, and may also be a separate tag, for example: a consumer may scan a two-dimensional bar code for service using a mobile phone when checking out after a meal, the two-dimensional bar code being a tag for identifying the merchant. The tag may be the aforementioned one-dimensional bar code, two-dimensional bar code, magnetic card, IC card or RFID tag, etc.

A second device 202 for acquiring thing identification information 230 about the thing 210 recorded by the tag 220. For example: if the tag 220 is a one-dimensional bar code, the second device 202 may obtain the thing identification information 230 about the thing 210 recorded by the tag 220 by scanning the tag 220 using a connected scanner. For another example: if the tag 220 is an RFID tag, the second device 202 may read the thing identification information 230 about the thing 210 recorded by the tag 220 using a built-in or external RFID card reader. For another example: if the tag 220 is a two-dimensional bar code, the second device 202 may obtain the thing identification information 230 about the thing 210 recorded by the tag 220 by scanning the two-dimensional bar code using a built-in or external camera.

A first device 201 for receiving the thing information 250 about the thing 210 from a third device 203, and sending same to the second device 202. Optionally, the first device 201 is trustworthy for the second device 202 and the third device 203. For example: the first device 201 is a device provided by a mobile operator, and the second device 202 is a mobile terminal of the mobile operator for providing services. The mobile terminal is built in with an RFID reader which can be used for scanning an RFID tag and reading thing identification information recorded by the tag. The device provided by the mobile operator is trustworthy for the mobile terminal, and the mobile operator is also trustworthy for the third device 203, that is, the mobile operator will not maliciously intercept thing information, and may take a certain secure measure when communicating with the second device 202 and the third device 203 to avoid transmitted information being intercepted as much as possible. The first device 201 performs information transfer as a third party trustworthy device, which can effectively ensure information transmission security.

A second device 202 for providing the thing information 250.

Optionally, the system 20 may further comprise a fourth device 204, for providing position information about a position where the thing information 250 is located. Correspondingly, the first device 201 is further used for acquiring the position information from the third device 203, and sending, when a thing information request message is sent, the thing information request message to the third device 203 where the position information is located.

Figure 3:
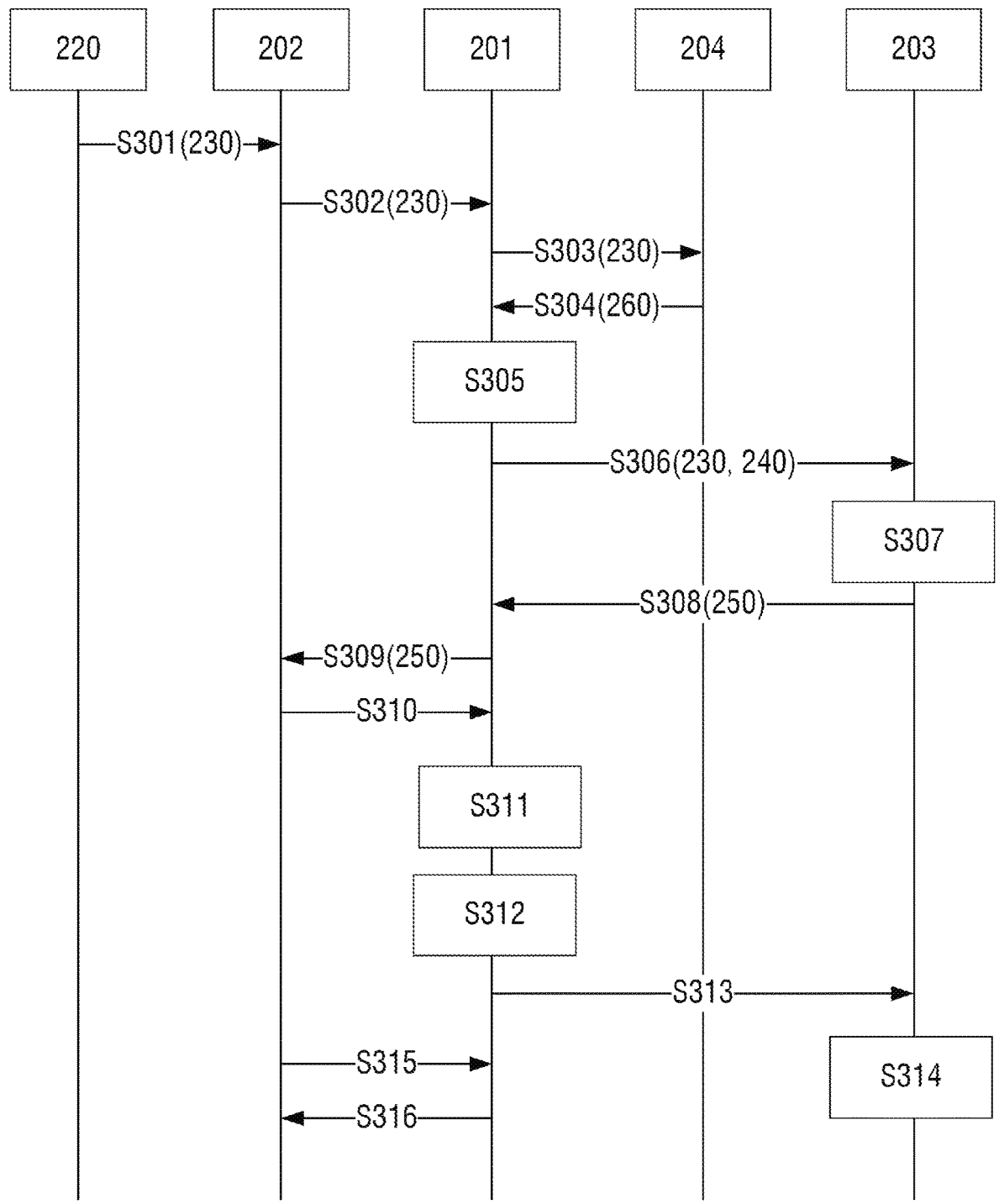
FIG. 3 is a flow chart of a first thing information transmission method in the Internet of Things provided by the embodiments of the present invention.

FIG. 3 is a flow chart of a first thing information transmission method in the Internet of Things provided by the embodiments of the present invention. As shown in FIG. 3, the method may comprise the following steps:

S301: the second device 202 acquiring the thing identification information 230 about the thing 210 from the tag 220, wherein the second device 202 may obtain the thing identification information 230 recorded in the tag 220 by scanning the tag 220 using a built-in or external code scanner or camera.

S302: the second device 202 sending the thing identification information 230 to the first device 201.

S303: the first device 201 requesting, after receiving the thing identification information 230, from a fourth device 204 position information 260 about a position where the thing identification information 230 is located, wherein the first device 201 may also store the position information 260 by itself, and in this way the first device 201 does not need to request from the fourth device 204 the position information 260.

S304: the fourth device 204 returning the position information 260 to the first device 201.

S305: the first device 201 determining verification information 240.

Optional implementations of the verification information 240 include, but are not limited to, the following two implementations:

Implementation I

The verification information 240 describes a device attribute of the second device 202, and does not comprise device identification information about the second device 202. The first device 201 may store a correlation between the device identification information and the device attribute in advance, determine the device identification information about the second device 202 after receiving the thing identification information 230 from the second device 202, and determine, according to the correlation between the device identification information and the device attribute stored in advance, a device attribute corresponding to the device identification information about the second device 202, such as: device brand information, device purchasing date information, etc.

Implementation II

The verification information 240 describes an attribute of a user of the second device 202, and does not comprise identity identification information about the user. The first device 201 may store a correlation between the identity identification information about the user and the attribute of the user in advance. The second device 202 may send the identity identification information about the user to the first device 201, and the first device 201 determines, according to the correlation between the identity identification information about the user and the attribute of the user stored in advance, the attribute of the user corresponding to the received identity identification information, such as: the age of the user, privileged member certificate information, etc.

Certainly, Implementation I and Implementation II may also be combined, that is, the verification information 240 comprises both the device attribute information about the second device 202, and the user attribute information about the second device 202.

Optionally, step S305 may be executed after step S302, the first device 201 receiving the thing identification information 230, and before step S303, requesting the position information 260, or be executed at the same time when or after the position information 260 is requested.

Optionally, in the process of executing step S305, the first device 201 may also perform legality verification on the second device 202 or the user of the second device 202. If the second device 202 is determined to be an illegal device, or the user of the second device 202 is determined to be an illegal user, subsequent steps will not be executed. Optionally, a thing information rejection message may also be returned to the second device 202, the message indicating that a rejection reason is illegal acquisition.

For example: a device blacklist may be set, the device blacklist recording device identification information, and if the device identification information about the second device 202 is recorded in the device blacklist, the second device 202 is determined to be an illegal device.

For another example: a user blacklist may be set, the user blacklist recording identity identification information about users, and if the identity identification information about a user of the second device 202 is recorded in the user blacklist, the user of the second device 202 is determined to be an illegal user.

For another example: if the first device 201 does not find the identity identification information about the user of the second device 202 in the correlation between the identity identification information about the user and the attribute of the user stored in advance, it is determined that the user of the second device 202 is an illegal user.

For another example: if the first device 201 does not find the device identification information about the second device 202 in the correlation between the device identification information and the device attribute stored in advance, it is determined that the second device 202 is an illegal device.

In this way, the first device 201 verifies the legality of the second device 202 or the user of the second device 202, which can also effectively avoid an illegal user acquiring the thing identification information 230.

S306: the first device 201 sending a thing information request message to a third device 203 indicated by the position information 260, the message including the verification information 240 and the thing identification information 230. In this way, the device identification information about the second device 202 or the identity identification information about the user of the second device 202 does not need to be sent to the third device 203, which thus avoids the leakage of the device identification information or the identity information about the user when the thing information 250 is acquired.

S307: the third device 203 determining, according to the verification information 240, whether the thing information request message has a permission of acquired thing information 250.

The third device 203 may store a correlation between verification information and a thing information access permission, and a correlation between thing identification information and thing information in advance. For example: the third device 203 stores a correlation between verification information and a condition satisfied by accessible thing information in advance. The third device 203 searches for a condition satisfied by corresponding accessible thing information according to the verification information 240, determines whether the thing information 250 about the thing 210 identified by the thing identification information 230 complies with the condition, if so, determines that the thing information request message has a permission of the acquired thing information 250, and if not, determines that the thing information request message does not have the permission of the acquired thing information 250.

S308: if the thing information request message has the permission of the acquired thing information 250, determining, according to the correlation between the thing identification information 230 and the thing information stored in advance, the thing information 250 corresponding to the thing identification information, and returning the thing information 250 to the first device 201.

S309: the first device 201 returning the thing information 250 to the third device 203.

Optionally, the first device 201 may also pay the fee for purchasing the thing 210, the specific steps being as follows:

S310: the second device 202 sending a thing purchasing request message for purchasing the thing 210 to the first device 201, wherein the second device 202 may include the thing identification information 230 in the thing purchasing request message.

S311: the first device 201 determining the thing 210, according to the thing identification information 230, and paying the fee for purchasing the thing 210.

S312: the first device 201 recording trade information about the thing 210, such as: trade price, trade date, trade time, etc.

S313: the first device 201 notifying the third device 203 to delete the thing information 250, wherein the first device 201 may notify the third device 203 to delete the thing information 250 after the thing 210 is traded successfully, and in this way, after the trade is successful, an interceptor is unable to acquire thing information from the server, which further ensures that the thing information is not intercepted.

S314: the third device 203 deleting the thing information 250, wherein, after a notification is received, the third device 203 deletes the thing information 250, and may further delete the correlation between the thing information 250 and the thing identification information 230.

Optionally, since in step S312 the first device 201 records the trade information about the thing 210, the first device 201 may provide the trade information for the second device 202.

S315: Optionally, the second device 202 requesting from the first device 201 trade information about the thing 210 via step S315.

S316: the first device 201 returning the trade information about the thing 210 to the second device 202.

Figure 4:
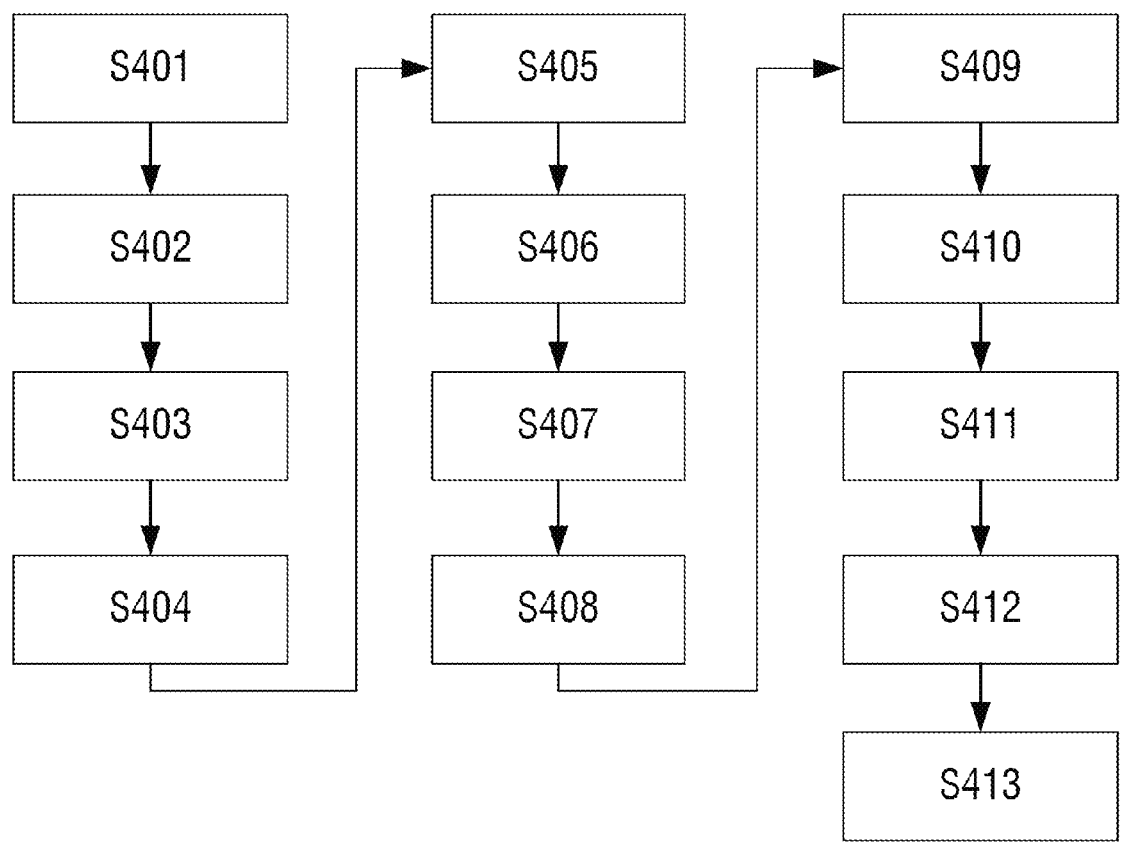
FIG. 4 is a flow chart of a second thing information transmission method in the Internet of Things provided by the embodiments of the present invention.

FIG. 4 is a flow chart of a second thing information transmission method in the Internet of Things provided by the embodiments of the present invention. The second thing information transmission method is executed by the aforementioned first device 201, and may specifically comprise the following steps:

S401: receiving thing identification information 230.

S402: requesting from a fourth device 204 position information 260 about a position where the thing identification information 230 is located.

S403: receiving the position information 260 returned by the fourth device 204.

S404: determining verification information 240.

S405: sending a thing information request message to a third device 203, the message including the verification information 240 and the thing identification information 230.

S406: receiving the thing information 250 from the third device 203.

S407: returning the thing information 250 to the second device 202.

S408: receiving a thing purchasing request message for purchasing a thing 210 from the second device 202.

S409: paying the fee for purchasing the thing 210.

S410: recording trade information about the thing 210.

S411: notifying the third device 203 to delete the thing information 250.

S412: receiving a request for trade information about the thing 210 from the second device 202.

S413: returning the trade information about the thing 210 to the second device 202.

Other optional implementations of the method may refer to the processing of the first device 201 in the procedure shown in FIG. 3, and the repeated contents will not be described.

Figure 5:
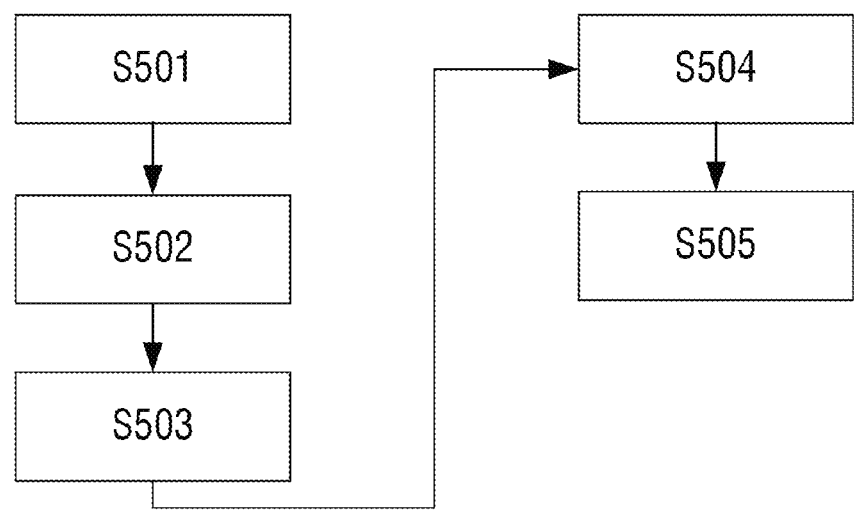
FIG. 5 is a flow chart of a third thing information transmission method in the Internet of Things provided by the embodiments of the present invention.

FIG. 5 is a flow chart of a third thing information transmission method in the Internet of Things provided by the embodiments of the present invention. The third thing information transmission method may be executed by the aforementioned third device 203, and may specifically comprise the following steps:

S501: receiving a thing information request message from a first device 201.

S502: determining, according to verification information 240 in the thing information request message, whether the thing information request message has a permission of acquired thing information 250.

S503: if it is determined that the thing information request message has a permission of the acquired thing information 250, sending the thing information 250 to the first device 201.

S504: receiving from the first device 201 a notification of deleting the thing information 250.

S505: deleting the thing information 250.

Optional implementations of the method may refer to the implementation of the third device 203 in FIG. 3, and the repeated contents will not be described.

Figure 6:
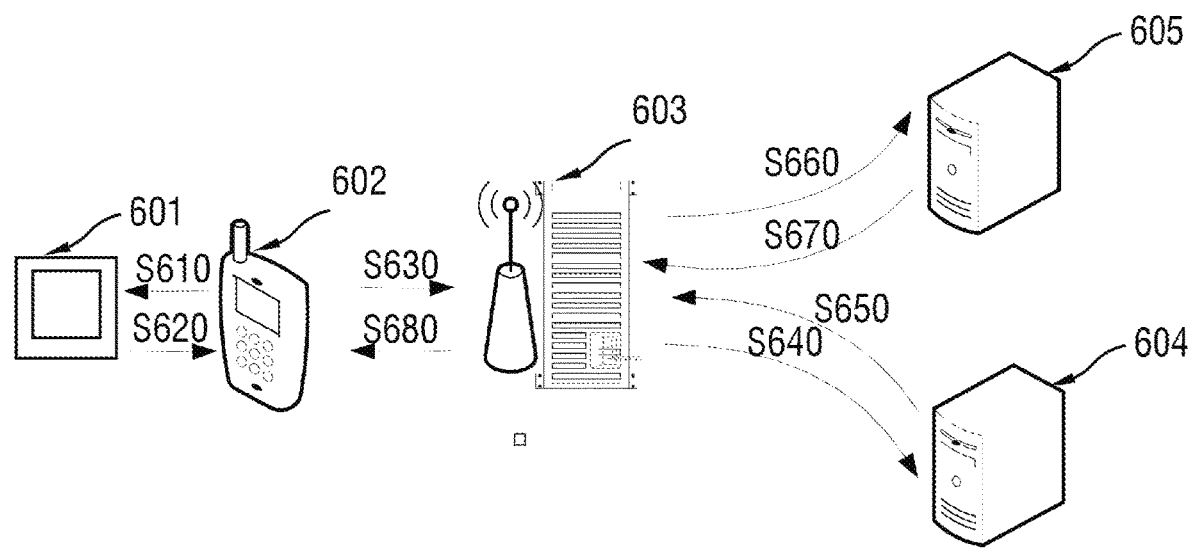
FIG. 6 is a flow chart of a fourth thing information transmission method in the Internet of Things provided by the embodiments of the present invention.

FIG. 6 is a flow chart of a fourth thing information transmission method in the Internet of Things provided by the embodiments of the present invention. The fourth thing information transmission method may be deemed to be an example of the method shown in FIG. 3.

A tag 601 recorded with an RFID is an example of the aforementioned tag 220. A mobile phone 602 is an example of the aforementioned second device 202. A mobile operator device 603 is an example of the aforementioned first device 201. An object naming service (ONS) server 604 is an example of the aforementioned fourth device 204. An OIS 605 is an example of the aforementioned third device 203. An EPC is an example of the aforementioned thing identification information 230.

As shown in FIG. 6, the method may comprise the following steps:

S610: the mobile phone 602 requesting from the tag 601 the EPC. For example: a user of the mobile phone 602 brings the mobile phone up to the tag 601, opens an application program (APP) on the mobile phone 602, and enables an RFID scanning apparatus built into the mobile phone 602 as a mobile RFID (MRFID) to scan the tag 601.

S620: the tag 601 returning the EPC to the mobile phone 602.

S630: the mobile phone 602 sending the received EPC to the mobile operator device 603; in addition, the mobile phone 602 sending identity identification information (such as: a username and password for logging into the mobile operator device 603) about a user to the mobile operator device 603, and the mobile operator device 603 authenticating the user, wherein since the mobile operator device 603 is trustworthy for the mobile phone 602, the mobile phone 602 can execute one Hash operation only in this step.

S640: the mobile operator device 603 requesting from the ONS server 604 a uniform resource locator (URL) of a position where thing information is located.

S650: the ONS 604 returning the URL of the OIS 605.

S660: the mobile operator device 603 sending a thing information request message to the OIS 605 according to the URL to request thing information, the message comprising the aforementioned verification information 240 such as OPC and the age, privileged member certificate of the user of the mobile phone 602, and not comprising the identity identification information about the user of the mobile phone 602, wherein the mobile operator device 603 may acquire non-real-name verification information 240 from a database thereof.

S670: The OIS 605 sending thing information to the mobile operator device 603, wherein the OIS 605 verifies the verification information 240 mentioned above, for example: an access control list in the database of the OIS 605 is queried, the access control list storing a correlation between verification information and a corresponding thing information access permission, and the OIS 605 determines a thing information access permission corresponding to the verification information 240 by looking up the list, and determines whether the received thing information request message has a permission of the acquired thing information, and if so, sends the thing information to the mobile operator device 603.

S680: the mobile operator device 603 sending the thing information to the mobile phone 602, wherein the communication between the mobile operator device 603 and the mobile phone 602 may be encrypted using an established session key.

Furthermore, after step S680, the procedure may further comprise:

the user may also purchase a thing labelled by the tag 601 via the mobile phone 602. The mobile operator device 602 may pay the fee for purchasing the thing on behalf of the mobile phone 602, and charge the fee to a mobile phone bill every month. If one thing identified by the EPC is traded successfully, the mobile operator device 602 notifies the OIS 605 to delete the thing information about the thing identified by the EPC. This can effectively avoid an interceptor obtaining detailed information about a thing purchased by the user of the mobile phone 602.

The mobile operator device 603 stores trade information about the mobile phone 602 in the database thereof. The mobile phone 602 can not only query the thing information recorded on the tag 601 accessed by same, but can also query the trade information recorded in the database.

The procedure shown in FIG. 6 is compared with the procedure shown in FIG. 1 below.

Firstly, in the procedure shown in FIG. 1, the computer 104 needs to serve as an agent to control the communication between the scanning device 103 and the tag 102. However, in the procedure shown in FIG. 6, an MRFID apparatus is built into the mobile phone 602 to complete the operations of tag scanning and communication control together, which simplifies the procedure complexity compared to the procedure shown in FIG. 1.

Secondly, in the procedure shown in FIG. 1, the computer 104 generally needs to execute two to three Hash operations for certification in a thing trade process. However, in the procedure shown in FIG. 6, since the mobile operator device 603 is trustworthy for the mobile phone 602, paying the fee for a thing by means of the mobile operator device 603 can simplify the certification process, and generally the mobile phone 602 only needs to execute one Hash operation.

Next, in the procedure shown in FIG. 1, the computer 104 sends the device identification or user's account name thereof to the OIS 105, and when the communication between the computer 104 and the OIS 105 is insecure, e.g., an interceptor exists, the device identification or user's account name of the computer 104 may be intercepted, and when the sensitive information is leaked, a risk that the computer or account is tracked exists. However, in the procedure shown in FIG. 6, the mobile operator device 603 is trustworthy for the mobile phone 602 and the tag 601, and the communication therebetween may be considered secure. When sending verification information to the OIS 605, the mobile operator device 603 only sends information such as the age and privileged member certificate about the user of the mobile phone 602, and will not send the identity identification information about the user. By means of this non-real-time certification method, even if there is an interceptor, the interceptor is unable to acquire the identity identification information about the user, and thus is also unable to track the position of the user.

Figure 7:
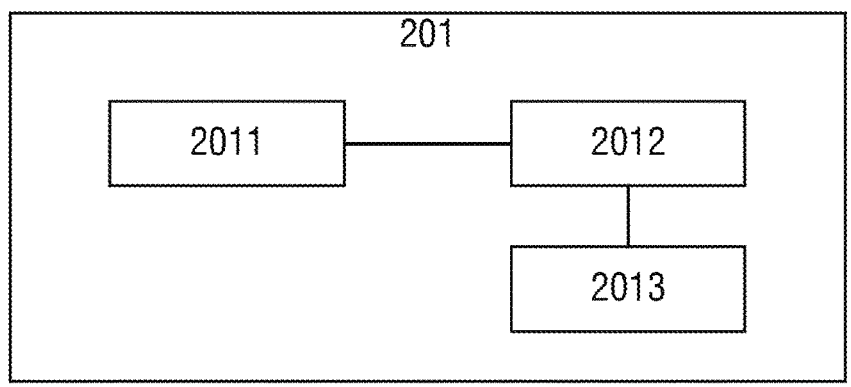
FIG. 7 is a schematic structural diagram of a first device provided by the embodiments of the present invention.

FIG. 7 is a schematic structural diagram of a first device 201 provided by the embodiments of the present invention. As shown in FIG. 7, the device may comprise:

a first transceiving module 2011, for receiving thing identification information 230 about a thing 210 in the Internet of Things from a second device 202, wherein the thing identification information 230 is recorded in one tag 220 for identifying the thing 210, and the second device 202 is used for acquiring the thing identification information 230 from the tag 220;

a processing module 2012, for determining verification information 240, wherein the verification information 240 describes a device attribute of the second device 202, and does not comprise device identification information about the second device 202, and/or the verification information 240 describes an attribute of a user of the second device 202, and does not comprise identity identification information about the user;

a second transceiving module 2013, for sending a thing information request message to a third device 203, wherein the thing information request message comprises the verification information 240 and the thing identification information 230, and the third device 203 is used for, when determining that the thing information request message has a permission of the acquired thing information 250 according to the verification information 240, providing the thing information 250;

the second transceiving module 2013, further for receiving the thing information 250 from the third device 203; and the first transceiving module 2011, further for sending the thing information 250 received by the second transceiving module 2013 to the second device 202.

Optionally, the processing module 2012 is further used for: after the first transceiving module 2011 receives the thing identification information 230 and before the processing module 2012 determines the verification information 240, determining, according to the device identification information about the second device 202, whether the second device 202 is legal; when determining the verification information 240, the processing module 2012 is specifically used for: if the second device 202 is legal, determining the verification information 240; and/or the processing module 2012 is further used for: after the first transceiving module 2011 receives the thing identification information 230 and before the processing module 2012 determines the verification information 240, determining, according to identity identification information about a user of the second device 202, whether the user of the second device 202 is legal, and when determining the verification information 240, the processing module 2012 is specifically used for: if the user of the second device 202 is legal, determining the verification information 240.

Optionally, the second device 202 acquires the thing information 250 to trade the thing 210, and the processing module 2012 is further used for: after the first transceiving module 2011 sends the thing information 250 received by the second transceiving module 2013 to the second device 202, recording trade information about the thing 210; and the first transceiving module 2011 is further used for: sending the trade information to the second device 202.

Optionally, the thing identification information 230 is used for uniquely identifying the thing 210, and the processing module 2012 is further used for: after determining that the thing 210 is traded successfully, notifying via the second transceiving module 2013 the third device 203 to delete the thing information 250.

Optionally, the first device 201 is trustworthy for the second device 202 and the third device 203.

Optionally, the first device 201 is a device provided by a mobile operator, and the second device 202 is a mobile terminal where the mobile operator provides services.

Other optional implementations of the first device 201 may refer to the implementation of the first device 201 in the aforementioned method and system, wherein the first transceiving module 2011 may be used for communicating with the second device 202 and communicating information; the processing module 2012 may be used for executing the operations of information processing, verification and control; and the second transceiving module 2013 maybe used for communicating with the third device 203 and the fourth device 204 and communicating information.

Figure 8:
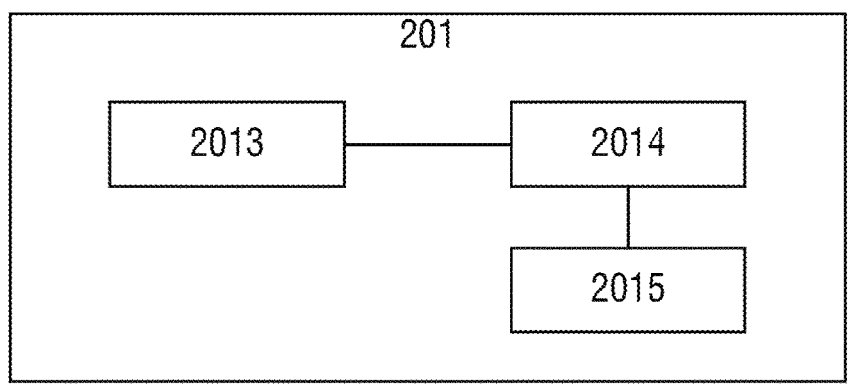
FIG. 8 is a schematic structural diagram of a second first device provided by the embodiments of the present invention.

FIG. 8 is a schematic structural diagram of a second first device 201 provided by the embodiments of the present invention. As shown in FIG. 8, the device may comprise:

a first transceiver 2014, for receiving thing identification information 230 about a thing 210 in the Internet of Things from a second device 202, wherein the thing identification information 230 is recorded in one tag 220 for identifying the thing 210, and the second device 202 is used for acquiring the thing identification information 230 from the tag 220;

a processor 2015, for determining verification information 240, wherein the verification information 240 describes a device attribute of the second device 202, and does not comprise device identification information about the second device 202, and/or the verification information 240 describes an attribute of a user of the second device 202, and does not comprise identity identification information about the user;

a second transceiver 2016, for sending a thing information request message to a third device 203, wherein the thing information request message comprises the verification information 240 and the thing identification information 230, and the third device 203 is used for, when determining that the thing information request message has a permission of the acquired thing information 250 according to the verification information 240, providing the thing information 250;

the second transceiver 2016, further for receiving the thing information 250 from the third device 203; and the first transceiver 2014, further for sending the thing information 250 received by the second transceiver 2016 to the second device 202.

Other optional implementations of the second first device 201 may refer to the implementation of the first device 201 in the aforementioned method and system, wherein the first transceiver 2014 may be used for communicating with the second device 202 and communicating information; the processor 2015 may be used for executing the operations of information processing, verification and control; and the second transceiver 2016 may be used for communicating with the third device 203 and the fourth device 204 and communicating information.

The second first device 201 may also be considered as an optional implementation of the first device 201 shown in FIG. 7 in specific implementation, wherein the first transceiver 2014 is used for implementing the operations of the first transceiving module 2011, which may be a wireless transceiver according to different communication methods with the second device 202, such as: a wireless fidelity (WIFI) module, a long term evolution (LTE) communication module, or other wireless communication modules. Certainly, the first device 201 and the second device 202 may also communicate with each other in a wired communication manner. The processor 2015 is used for implementing the operations of the processing module 2012, which may comprise at least one central processing unit (CPU) and/or at least one digital signal processor (DSP), etc. The second transceiver 2016 is used for implementing the operations of the second transceiving module 2013, which may be the aforementioned wireless transceiver according to different communication methods with the third device 203 and the fourth device 204. Certainly, the first device 201 may also communicate with the third device 203 and the fourth device 204 in a wired communication manner, for example: an optical fiber communication method is used, and at this time the second transceiver 2016 can be an optical module.

Figure 9:
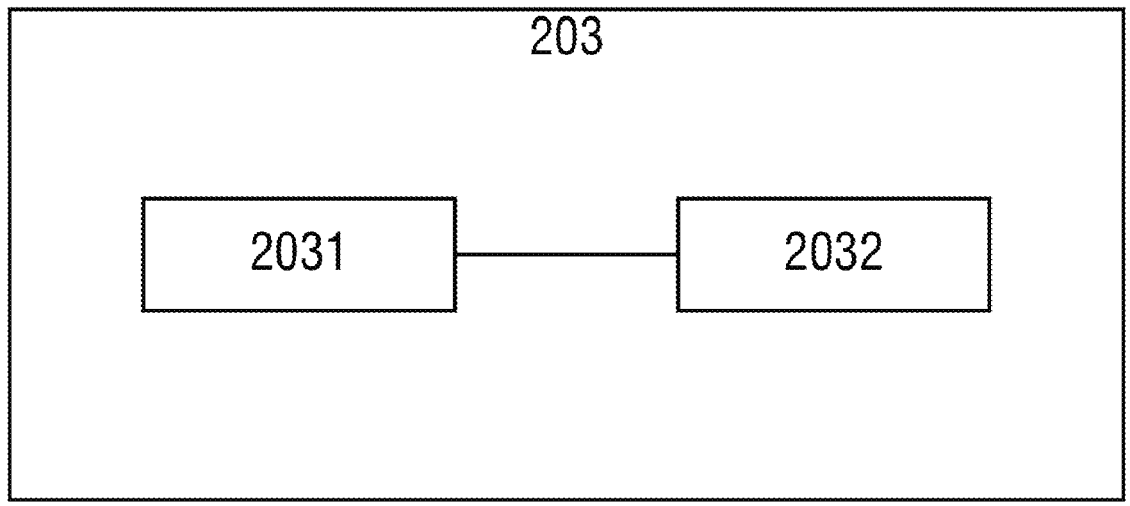
FIG. 9 is a schematic structural diagram of a first third device provided by the embodiments of the present invention.

FIG. 9 is a schematic structural diagram of a first third device 203 provided by the embodiments of the present invention. As shown in FIG. 9, the third device 203 may comprise:

a transceiving module 2031, for receiving a thing information request message from a first device 201, the thing information request message comprising the verification information 240 and the thing identification information 230, wherein the thing identification information 230 is recorded in a tag 220 for identifying a thing 210 in the Internet of Things; the verification information 240 describes a device attribute of the second device 202, and does not comprise device identification information about the second device 202, and/or the verification information 240 describes an attribute of a user of the second device 202, and does not comprise identity identification information about the user;

a processing module 2032, for determining, according to the verification information 240, whether the thing information request message has a permission of the acquired thing information 250; and the transceiving module 2031, further for, if the thing information request message has a permission of the acquired thing information 250, sending the thing information 250 to the first device 201.

Optionally, the thing identification information 230 is used for uniquely identifying the thing 210, and the thing information 250 is acquired to trade the thing 210, and the processing module 2032 is further used for: after receiving from the first device 201 via the transceiving module 2031 a notification of deleting the thing information 250, deleting the thing information 250.

Other optional implementations of the first third device 203 may refer to the implementation of the third device 203 in the aforementioned method and system, wherein the transceiving module 2031 may be used for communicating with the first device 201 and communicating information; and the processing module 2032 may be used for executing the operations of information processing, verification and control.

Figure 10:
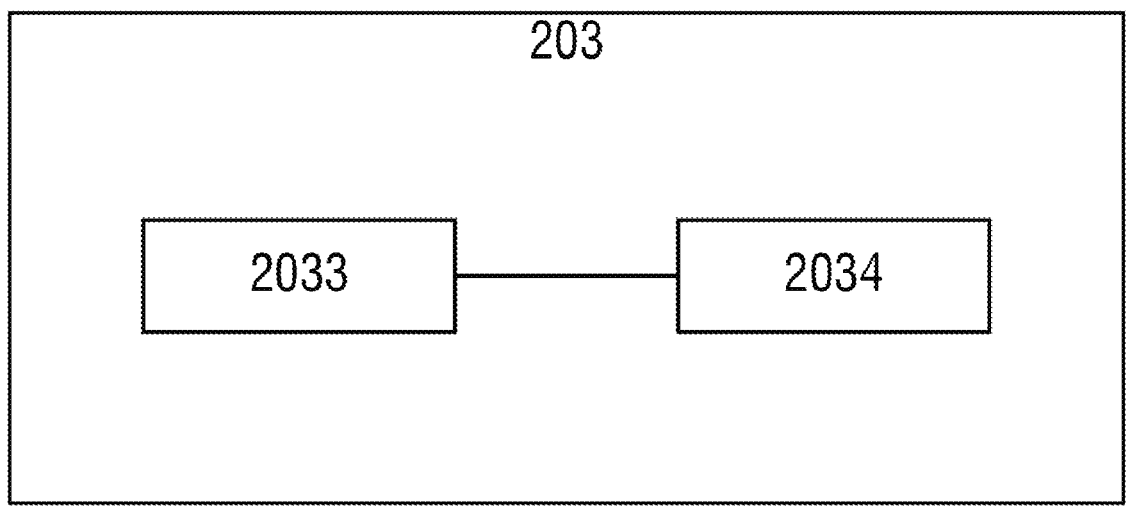
FIG. 10 is a schematic structural diagram of a second third device provided by the embodiments of the present invention.

FIG. 10 is a schematic structural diagram of a second third device 203 provided by the embodiments of the present invention. As shown in FIG. 10, the third device 203 may comprise:

a transceiver 2033, for receiving a thing information request message from a first device 201, the thing information request message comprising the verification information 240 and the thing identification information 230, wherein the thing identification information 230 is recorded in a tag 220 for identifying a thing 210 in the Internet of Things; the verification information 240 describes a device attribute of the second device 202, and does not comprise device identification information about the second device 202, and/or the verification information 240 describes an attribute of a user of the second device 202, and does not comprise identity identification information about the user;

a processor 2034, for determining, according to the verification information 240, whether the thing information request message has a permission of the acquired thing information 250; and the transceiver 2033, further for, if the thing information request message has a permission of the acquired thing information 250, sending the thing information 250 to the first device 201.

Other optional implementations of the second third device 203 may refer to the implementation of the third device 203 in the aforementioned method and system, wherein the transceiver 2033 may be used for communicating with the first device 201 and communicating information; and the processor 2034 may be used for executing the operations of information processing, verification and control.

The second third device 203 may also be considered as an optional implementation of the first third device 203 shown in FIG. 9 in specific implementation, wherein the transceiver 2033 is used for implementing the operations of the transceiving module 2031, and the third device 203 and the first device 201 may also communicate with each other in a wired communication manner. For example: an optical fiber communication method is used, and at this time the transceiver 2033 can be an optical module. The processor 2034 is used for implementing the operations of the processing module 2032, which may comprise at least one CPU and/or at least one DSP, etc.

The embodiments of the present invention further provide a machine readable medium, wherein the machine readable medium stores thereon machine instructions that, when being executed by a processor, cause the processor to execute any one of the aforementioned thing information transmission methods in the Internet of Things. Specifically, a system or apparatus with a machine readable medium may be provided, and software program codes for implementing the functions of any one of the embodiments described above are stored on the machine readable medium, and a computer or processor of the system or apparatus is caused to read and execute machine readable instructions stored in the machine readable medium.

In this condition, the program codes per se read from the machine readable medium may implement the functions of any one of the embodiments described above, and therefore the machine readable codes and the machine readable medium storing the machine readable codes constitute a part of the present invention.

The embodiments of the machine readable medium comprise a floppy disk, a hard disk, a magnetic optical disk, an optical disk (such as CD-ROM, CD-R, CD-RW, DVD-ROM, DVD-RAM, DVD-RW and DVD+RW), a magnetic tape, a non-volatile memory card and ROM. Optionally, the program codes may be downloaded from a server computer or a cloud via a communication network.

It needs to be noted that not all the steps and modules in the flows and structural diagrams of the system described above are necessary, and some steps or modules may be omitted according to practical requirements. The execution order of the various steps is not fixed and may be adjusted according to requirements. The system structure described in the various embodiments above may be a physical structure and may also be a logical structure, i.e. some modules may be implemented by the same physical entity, or some modules may be implemented separately by a plurality of physical entities, or may be implemented together by some components in a plurality of independent devices.

In the various embodiments above, a hardware unit may be implemented mechanically or electrically. For example, a hardware unit may comprise a permanent dedicated circuit or logic (such as a dedicated processor, FPGA or ASIC) to accomplish a corresponding operation. The hardware unit may also comprise a programmable logic or circuit (such as a general-purpose processor or other programmable processors), and may be set temporarily by hardware to accomplish a corresponding operation. The specific implementation method (mechanically, or a dedicated permanent circuit, or a temporarily set circuit) may be determined in consideration of cost and time.

The present invention is illustrated and described in detail above byway of drawings and preferred embodiments; however, the present invention isnot limited to these disclosed embodiments. Based on the plurality of embodiments described above, those skilled in the art would know that code checking devices/programs in different embodiments above may be combined to obtain more embodiments of the present invention, and these embodiments also fall within the scope of protection of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
receiving, at a first device, thing identification information about a thing in the Internet of Things from a second device, wherein the thing identification information is recorded in one tag for identifying the thing, and wherein the second device is used for acquiring the thing identification information from the tag;

determining, at the first device, verification information, the verification information at least one of
  describing a device attribute of the second device, and not including device identification information about the second device, and
  describing an attribute of a user of the second device, and not including identity identification information about the user;
sending, from the first device, a thing information request message to a third device, the thing information request message including the verification information and the thing identification information, the third device being usable for, upon determining that the thing information request message has a permission of the acquired thing information according to the verification information, providing the thing information;
receiving, at the first device, the thing information from the third device; and
sending, from the first device, the received thing information to the second device, wherein the first device is trustworthy for the second device and the third device and wherein at least one of:
after the receiving of the thing identification information at the first device and before the determining of the verification information, the method further comprises:
  determining, at the first device and according to the device identification information about the second device, whether the second device is legal, and wherein the determining of the verification information includes determining, upon the first device determining that the second device is legal, the verification information; and
after receiving of the thing identification information at the first device and before determining of the verification information, the method further comprises:
  determining, at the first device and according to the identity identification information about a user of the second device, whether the user of the second device is legal, and wherein determining of the verification information includes determining, upon the first device determining that the user of the second device is legal, the verification information.

2. The method of claim 1, wherein the thing information is acquired by the second device to trade the thing, and after the sending of the received thing information from the first device to the second device, the method further comprises:
  recording, at the first device, trade information about the thing; and
  sending, from the first device, the trade information to the second device.

3. The method of claim 2, wherein the thing identification information is used for uniquely identifying the thing, and wherein the method further comprises:
  notifying, after the determining at the first device that the thing is traded successfully, the third device to delete the thing information.

4. The method of claim 1, wherein the first device is a device provided by a mobile operator, and wherein the second device is a mobile terminal where the mobile operator provides services.

5. A first device, comprising:
  a first transceiver, to receive thing identification information about a thing in the Internet of Things from a second device, wherein the thing identification information is recordable in one tag for identifying the thing and wherein the second device is usable for acquiring the thing identification information from the tag;
  a processor to determine verification information, the verification information describing at least one of
    a device attribute of the second device, and does not include device identification information about the second device, and
    an attribute of a user of the second device, and does not include identity identification information about the user;
  a second transceiver, to send a thing information request message to a third device, the thing information request message including the verification information and the thing identification information, and the third device being usable for, upon determining that the thing information request message has a permission of the acquired thing information according to the verification information, provide the thing information,
  the second transceiver further being configured to receive the thing information from the third device; and
  the first transceiver being further configured to send the thing information received by the second transceiver to the second device,
  wherein the first device is trustworthy for the second device and the third device and
  wherein the processor is configured to, after the first transceiver receives the thing identification information and before the processor determines the verification information, at least one of
    determine, according to the device identification information about the second device, whether the second device is legal, and upon determining the verification information, the processor is configured to, upon the second device being legal, determine the verification information; and
    determine, according to identity identification information about a user of the second device, whether the user of the second device is legal, and upon determining the verification information, the processor is configured to, upon the user of the second device being legal, determine the verification information.

6. The device of claim 5, wherein the second device is configured to acquire the thing information to trade the thing,
  the processor is further configured to, after the first transceiver sends the thing information received by the second transceiver to the second device, record trade information about the thing; and
  the first transceiver is further configured to send the trade information to the second device.

7. The device of claim 6, wherein the thing identification information is used for uniquely identifying the thing and the processor is further configured to, after determining that the thing is traded successfully, notify, via the second transceiver, the third device to delete the thing information.

8. The device of claim 5, wherein the first device is a device provided by a mobile operator, and the second device is a mobile terminal where the mobile operator provides services.

9. A non-transitory machine readable medium storing machine instructions to, when executed by a processor, cause the processor to:
  receive thing identification information about a thing in the Internet of Things from a second device, the thing identification information being recorded in one tag for identifying the thing and the second device being usable for acquiring the thing identification information from the tag;

determine verification information, the verification information at least one of describing a device attribute of the second device and not including device identification information about the second device, and describing an attribute of a user of the second device and not including identity identification information about the user;

send a thing information request message to a third device, the thing information request message including the verification information and the thing identification information, and the third device being usable for, when determining that the thing information request message has a permission of the acquired thing information according to the verification information, providing the thing information;

receive the thing information from the third device; and send the received thing information to the second device, wherein the processor is trustworthy for the second device and the third device, and wherein at least one of:

after receiving the thing identification information and before the determining of the verification information, the method further comprises:

determining, according to the device identification information about the second device, whether the second device is legal, and wherein the determining of the verification information includes determining, upon determining that the second device is legal, the verification information; and after receiving of the thing identification information and before determining of the verification information, the method further comprises:

determining, according to the identity identification information about a user of the second device, whether the user of the second device is legal, and wherein determining of the verification information includes determining, upon determining that the user of the second device is legal, the verification information.

10. The non-transitory machine readable medium of claim 9, wherein the thing information is acquired by the second device to trade the thing, and after the sending of the received thing information from the first device to the second device, the machine instructions, when executed by a processor, further cause the processor to:

record, at the first device, trade information about the thing; and send, from the first device, the trade information to the second device.

11. The method of claim 10, wherein the thing identification information is used for uniquely identifying the thing, and wherein the machine instructions, when executed by a processor, further cause the processor to:

notify, after the determining at the first device that the thing is traded successfully, the third device to delete the thing information.

12. The method of claim 9, wherein the first device is a device provided by a mobile operator, and wherein the second device is a mobile terminal where the mobile operator provides services.

* * * * *